(12) United States Patent
O'Neill

(10) Patent No.: US 9,983,045 B2
(45) Date of Patent: May 29, 2018

(54) INDUCTIVE SENSOR

(71) Applicant: KSR IP Holdings LLC., Wilmington, DE (US)

(72) Inventor: Dan O'Neill, Chatham (CA)

(73) Assignee: KSR IP Holdings LLC, Wilmington, DE (US)

( * ) Notice: Subject to any disclaimer, the term of this patent is extended or adjusted under 35 U.S.C. 154(b) by 177 days.

(21) Appl. No.: 14/833,500

(22) Filed: Aug. 24, 2015

(65) Prior Publication Data

US 2016/0109279 A1     Apr. 21, 2016

Related U.S. Application Data

(60) Provisional application No. 62/040,490, filed on Aug. 22, 2014.

(51) Int. Cl.
| | |
|---|---|
| *G01F 23/36* | (2006.01) |
| *G01D 5/20* | (2006.01) |
| *G01F 23/38* | (2006.01) |

(52) U.S. Cl.
CPC ............. *G01F 23/363* (2013.01); *G01D 5/20* (2013.01); *G01D 5/202* (2013.01); *G01D 5/2006* (2013.01); *G01D 5/2013* (2013.01); *G01F 23/36* (2013.01); *G01F 23/38* (2013.01)

(58) Field of Classification Search
CPC ....................................................... G01F 23/38
See application file for complete search history.

(56) References Cited

U.S. PATENT DOCUMENTS

| | | | |
|---|---|---|---|
| 4,986,124 A | 1/1991 | Byrne et al. | |
| 5,941,122 A | 8/1999 | Nelson et al. | |
| 6,384,598 B1 | 5/2002 | Hobein et al. | |
| 6,661,647 B2* | 12/2003 | Kirchhevel | ....... G02F 1/133308 |
| | | | 248/920 |
| 7,999,534 B2 | 8/2011 | Hori et al. | |
| 8,453,518 B2 | 6/2013 | Diekmann et al. | |
| 2005/0083045 A1* | 4/2005 | Miyagawa | .............. G01F 23/38 |
| | | | 324/207.25 |
| 2005/0103103 A1* | 5/2005 | Newman | ................. G01F 23/32 |
| | | | 73/313 |
| 2008/0054887 A1 | 3/2008 | Lee | |
| 2009/0079422 A1 | 3/2009 | Lee | |
| 2012/0293166 A1 | 11/2012 | Lee et al. | |

(Continued)

FOREIGN PATENT DOCUMENTS

| | | |
|---|---|---|
| CN | 102297713 A | 12/2011 |
| DE | 1813352 A1 | 7/1970 |
| EP | 1312889 A2 | 5/2003 |

(Continued)

OTHER PUBLICATIONS

International Search Report, International Application No. PCT/US2015/046529, Filed Aug. 24, 2015.

*Primary Examiner* — Paul West
(74) *Attorney, Agent, or Firm* — Dinsmore & Shohl LLP

(57) ABSTRACT

An inductive sensor device for sensing the level of a liquid within a reservoir. The inductive sensor device includes a rotor pivotally connected to an overmold housing. Further, an inductive coupler is mounted to the rotor. Moreover, a float is connected to the rotor to pivot the inductive coupler by the at least one receiving coil to determine the level of liquid within the reservoir.

18 Claims, 13 Drawing Sheets

(56) References Cited

U.S. PATENT DOCUMENTS

2014/0116131 A1* 5/2014 Forgue .................... G01F 23/38
73/313
2015/0369648 A1* 12/2015 Bertalan ................. G01F 23/36
73/313

FOREIGN PATENT DOCUMENTS

| WO | 2004017025 A1 | 2/2004 |
| WO | 2009074864 A2 | 6/2009 |
| WO | 2011089519 A1 | 7/2011 |

* cited by examiner

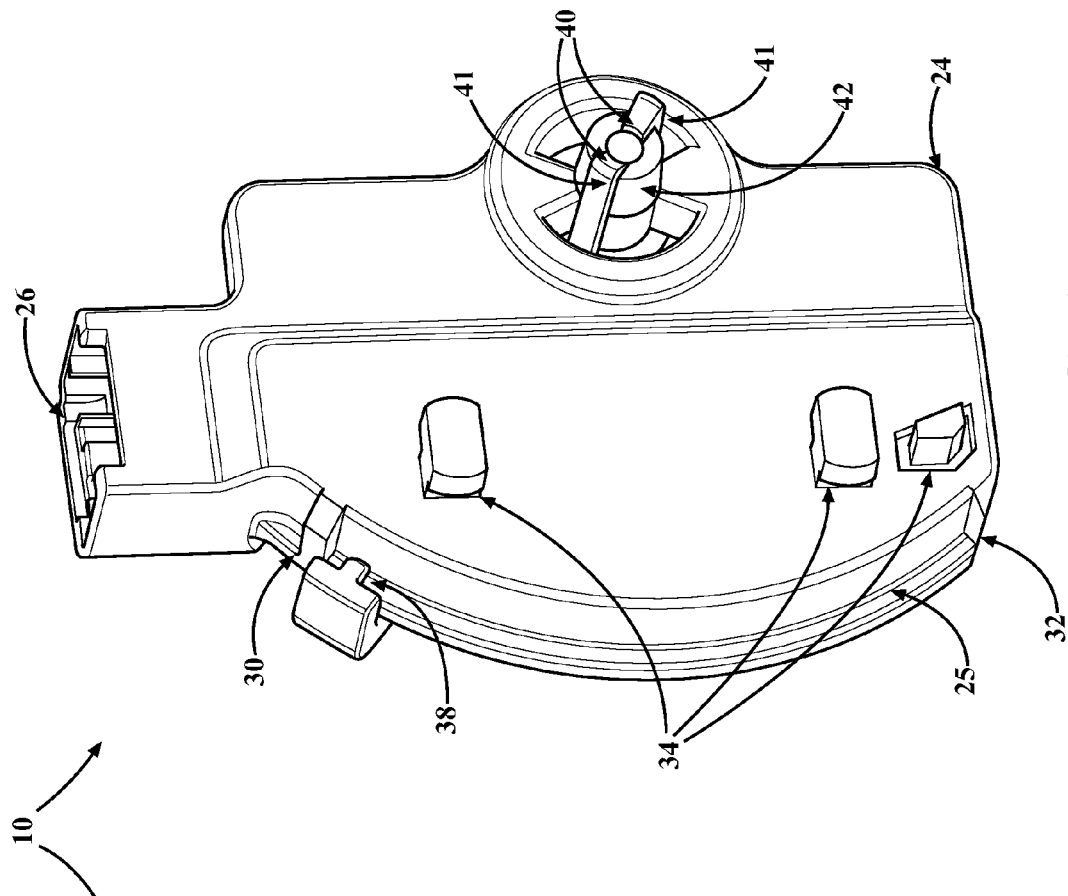
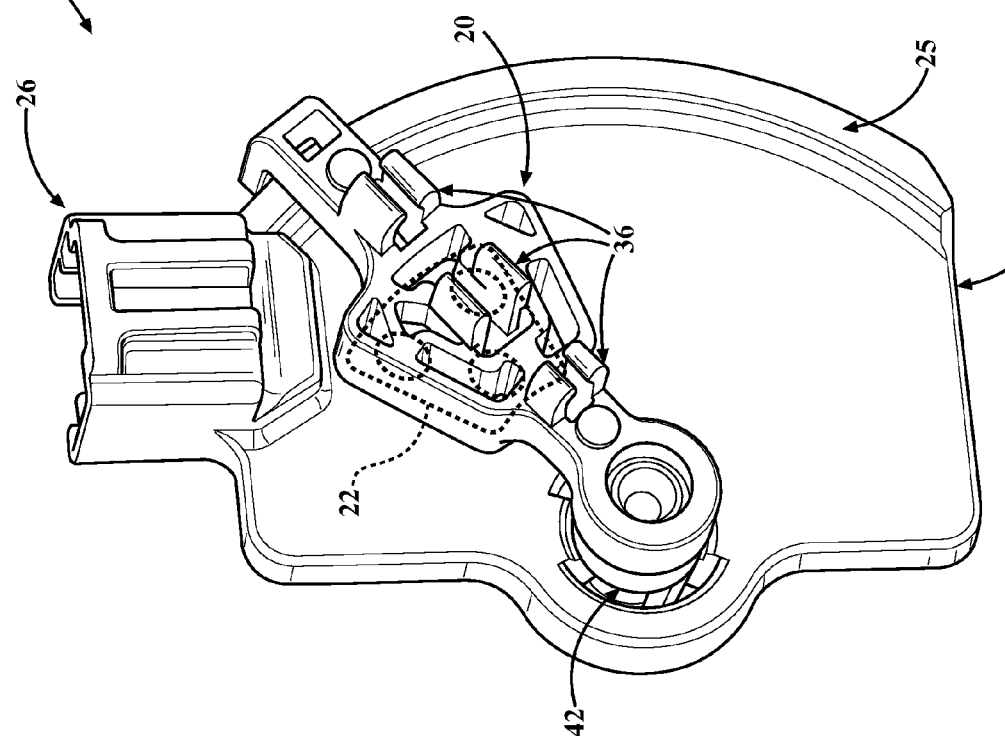
FIG. 1A
FIG. 1B

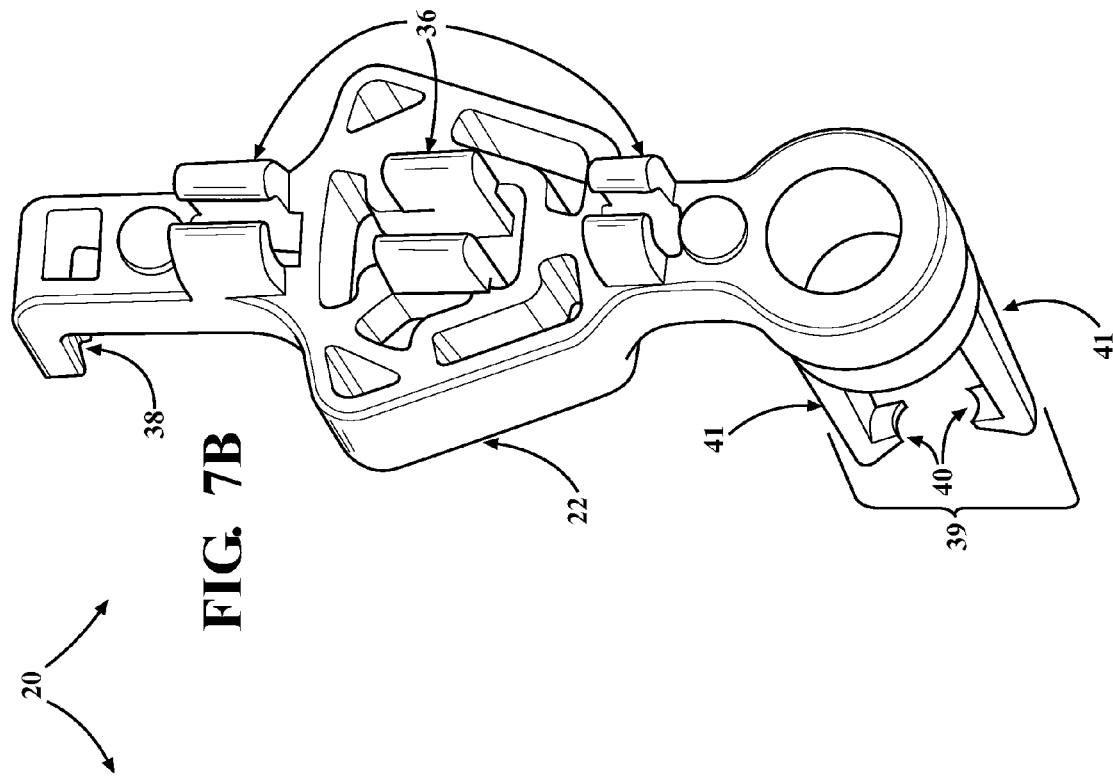
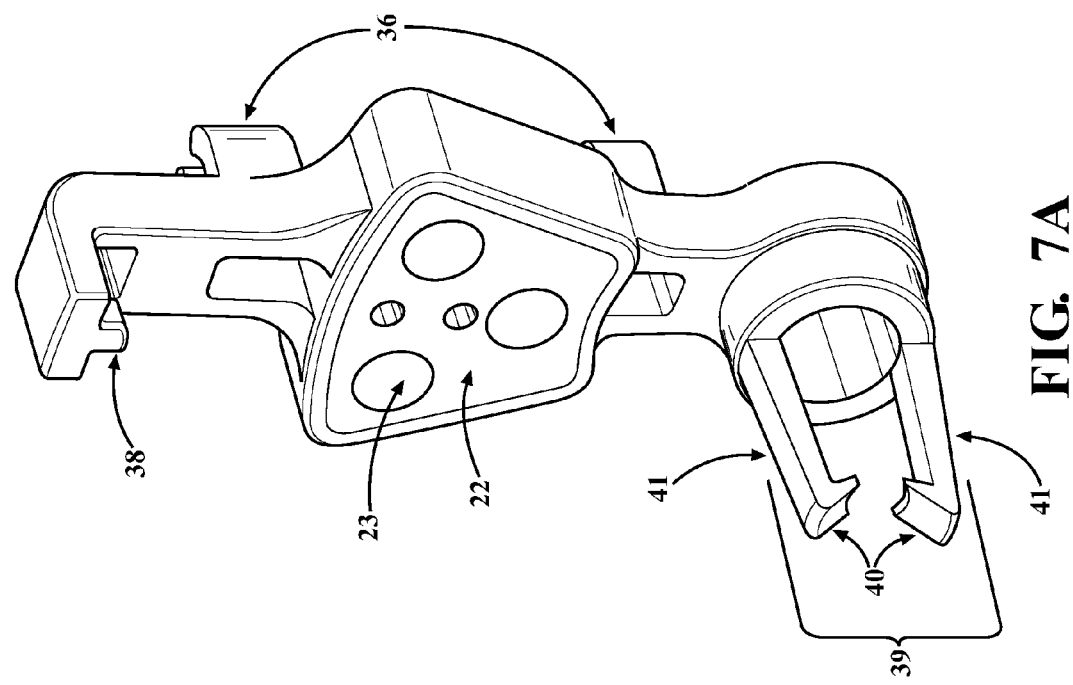

INDUCTIVE SENSOR

CROSS-REFERENCE TO RELATED APPLICATIONS

The present Utility patent application claims priority benefit of the U.S. provisional application for patent Ser. No. 62/040,490, filed on Aug. 22, 2014, under 35 U.S.C. 119(e).

FIELD OF THE INVENTION

One or more embodiments of the invention generally relate to a liquid level sensor. More particularly, the invention relates to an inductive sensor for determining a liquid level within a reservoir.

BACKGROUND OF THE INVENTION

Liquid level sensors are used in tanks that house liquids, such as fuel, to determine the amount of liquid remaining in the tank. Most fuel sensors use a float that communicates the surface level of the fuel to a sensing unit. The sensing unit converts the angular position of the float into a fuel level in the tank. Common sensing units include mechanical gauges, potentiometer sensors, and magnetic position sensors. However, mechanical gauges and potentiometers can be inaccurate while magnetic sensors can degrade over time.

Compared to other magnetic position sensors, inductive sensors are more cost effective because they do not need a magnet and instead use an electromagnetic coil. Inductive sensors are also desirable to use in vehicles instead of magnetic type sensors because inductive sensors are generally more reliable. Magnetic sensors can suffer performance loss as the magnet degrades and are more sensitive to magnetic disturbances from the surrounding environment. Accordingly, it is desirable to have a sensor not dependent upon magnets and more tolerant of interference from common automotive devices such as electric motors and alternators.

SUMMARY OF THE INVENTION

The present inductive sensor device is for sensing the level of a liquid within a reservoir. The inductive sensor device includes a rotor pivotally connected to an overmold housing. Further, an inductive coupler is mounted to the rotor. Moreover, a float is connected to the rotor to pivot the inductive coupler by the at least one receiving coil to determine the level of liquid within the reservoir.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

FIG. 1A illustrates a front view of the inductive sensor device 10, in accordance with an embodiment of the present invention;

FIG. 1B illustrates a backside view of the inductive sensor device 10, in accordance with an embodiment of the present invention;

FIG. 7A illustrates an inside view of the rotor, in accordance with an embodiment of the present invention;

FIG. 7B illustrates an outside view of the rotor, in accordance with an embodiment of the present invention;

DETAILED DESCRIPTION OF THE INVENTION

Figure 2:
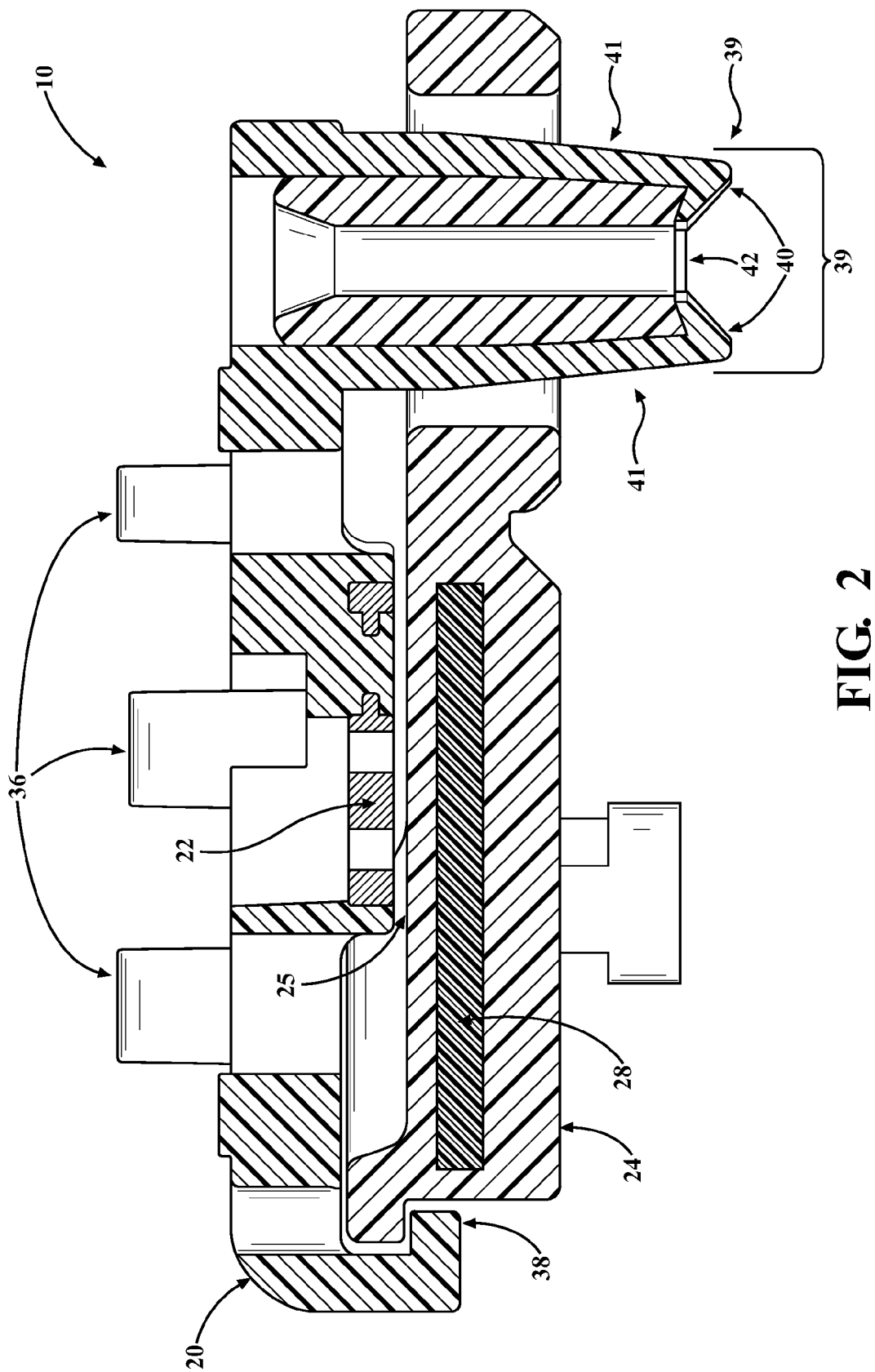
FIG. 2 illustrates a cross section view of the inductive sensor device 10, in accordance with an embodiment of the present invention.
Figure 3:
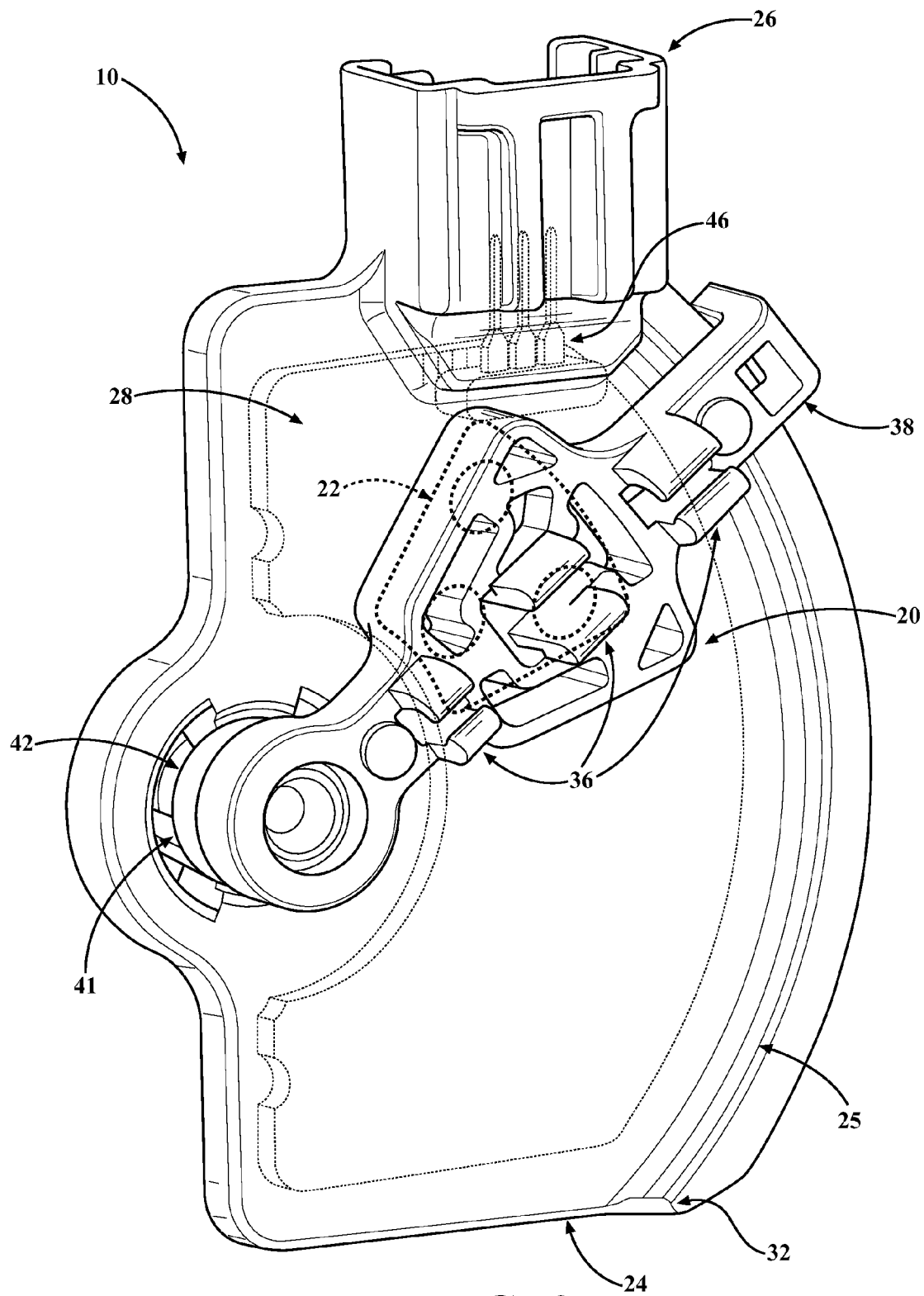
FIG. 3 illustrates FIG. 1A showing the single printed circuit board within the housing, in accordance with an embodiment of the present invention.
Figure 4B:
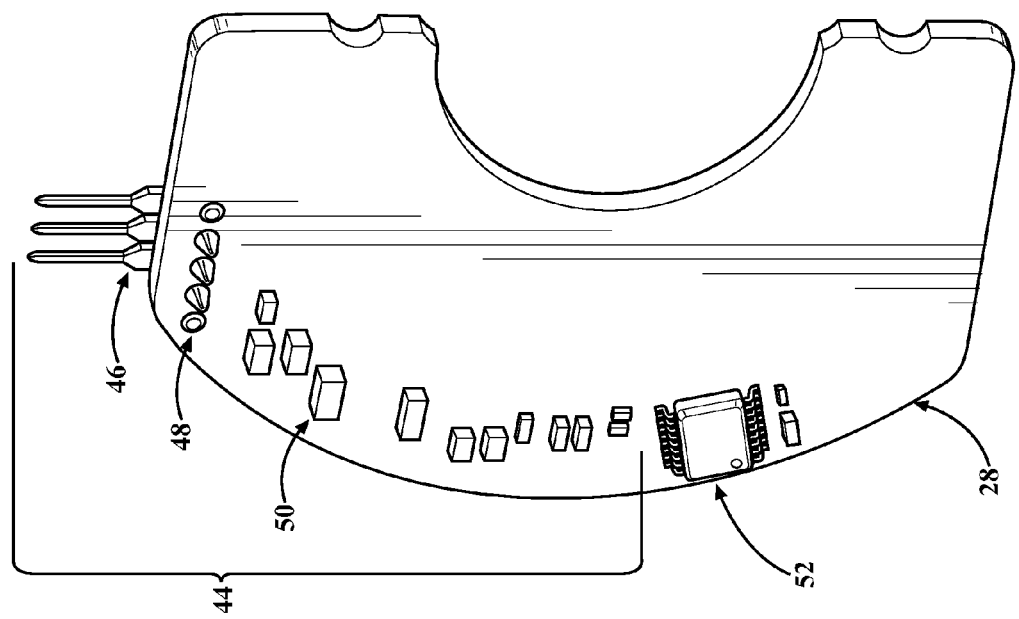
FIG. 4B illustrates the back view of the single printed circuit board, in accordance with an embodiment of the present invention.
Figure 4A:
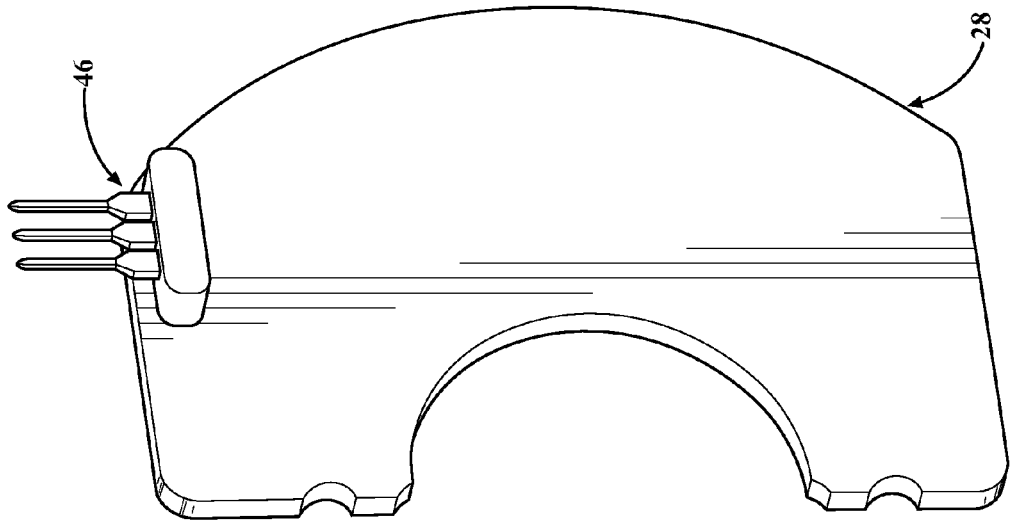
FIG. 4A illustrates the front view of the single printed circuit board, in accordance with an embodiment of the present invention.

The present inductive sensor is a device for sensing the level of a liquid in a reservoir. This sensor is particularly suited for sealed tanks, such as fuel tanks in vehicles. Moreover, the inductive sensor provides an accurate and low cost solution that offers size and weight savings compared to existing fuel sensor designs, such as Hall Effect sensors or a contacting type sensor as illustrated in FIGS. 10A-10B and 11A-11B, because the inductive sensor detects the position of a target by measuring the mutual inductance between the target and the sensing coupler.

The present inductive device includes a rotor, a sensing coupler, an overmold housing, an integrated connector, and a single printed circuit board. The single printed circuit board, while encapsulated in the overmold housing, contains an integrated connector to communicate between the single printed circuit board and an outside system such as a vehicle system. Furthermore, the single printed circuit board contains a microprocessor, a plurality of electrical components, including, but not limited to, capacitors, resistors, diodes, fuses, and terminal pins. Moreover, the printed circuit board, through mutual inductance, creates an oscillating signal generated to the transmitting coil and receiving coil generating an amount of current correlated to the sensing coupler of the rotor, which in turn actuates the float of the liquid system. As the float moves with the liquid level in the reservoir, the rotor, pivotally connected to the housing, moves up and down along the overmold housing relative to the liquid level. The sensing coupler, incorporated within the rotor, acts as a resonator. The printed circuit board, through the passive wireless antenna, detects the changes in the coupler which is communicated through the integrated connector to the vehicle system and ultimately to the diver information display.

Another advantage of the present inductive sensor system is that in a fuel system environment, the device is designed to replace existing fuel sensors without changing the design of components such as the float or the fuel sensor mount.

With reference now to FIGS. 1A-1B through 11A-11B, the inductive sensor device 10, includes a rotor 20, a sensing coupler 22, an overmold housing 24, an integrated connector 26, and a single printed circuit board 28 to measure the level of liquid 12 within a reservoir 14 in a vehicle (not shown). The single printed circuit board 28 is encapsulated in the overmold housing 24. The integrated connector 26 connects the single printed circuit board 28 to an outside system such as, without limitation, a vehicle system. The rotor 20 and the sensing coupler 22 are, without limitation, pivotally affixed or snapped into the overmold housing 24.

As shown in FIGS. 7A-7B and 8A-8B, the sensing coupler 22 may contain a plurality of bosses 23 extending and/or recessed from the coupler 22 surface. Moreover, the coupler 22 and boss 23 are incorporated within the rotor 20. The rotor 20 is connected pivotally to housing 24. The rotor 20 has a clip assembly 39 provided with a clip end 40 attached to legs 41 that are flexible so that the legs 41 and the clip end 40 may be bent inwards into the receiver 42 of the housing 24.

With reference again to FIGS. 1A-1B through 11A-11B, the rotor 20 rotates about the overmold housing 24 between an up position and a down position in a guide track 25. Further, the rotor 20 is comprised of a suitable material, such as a plastic. Moreover, the rotor 20 has a stop tab 38 working in conjunction with the overmold housing 24 and the guide track 25, an up-stop 30, and a down-stop 32 to prevent the rotor 20 from rotating outside of the desired range. Further, the overmold housing 24 has mounting points 34 on a side opposite the rotor 20 for mounting, without limitation, to an existing fuel sensor mount points (not shown) on a fuel pump 62 within a fuel tank reservoir 14. Additionally, the rear of the rotor 20 has clips 36 designed to hold the flat rod 66 that connects to the liquid float 64.

Now referring to FIG. 2, the inductive sensor 10 is shown in cross section where the single printed circuit board 28 is encapsulated in the housing 24. The rotor 20 and sensing coupler 22 are pivotally affixed through the clip assembly 39 into the housing 24 via the receiver 42. Further, the rotor 20 contains a stop tab 38 to prevent the rotor 20 from extending or retracting beyond the overmold housing 24 up-stop 30 and down-stop 32 within the guide track 25.

Figure 5:
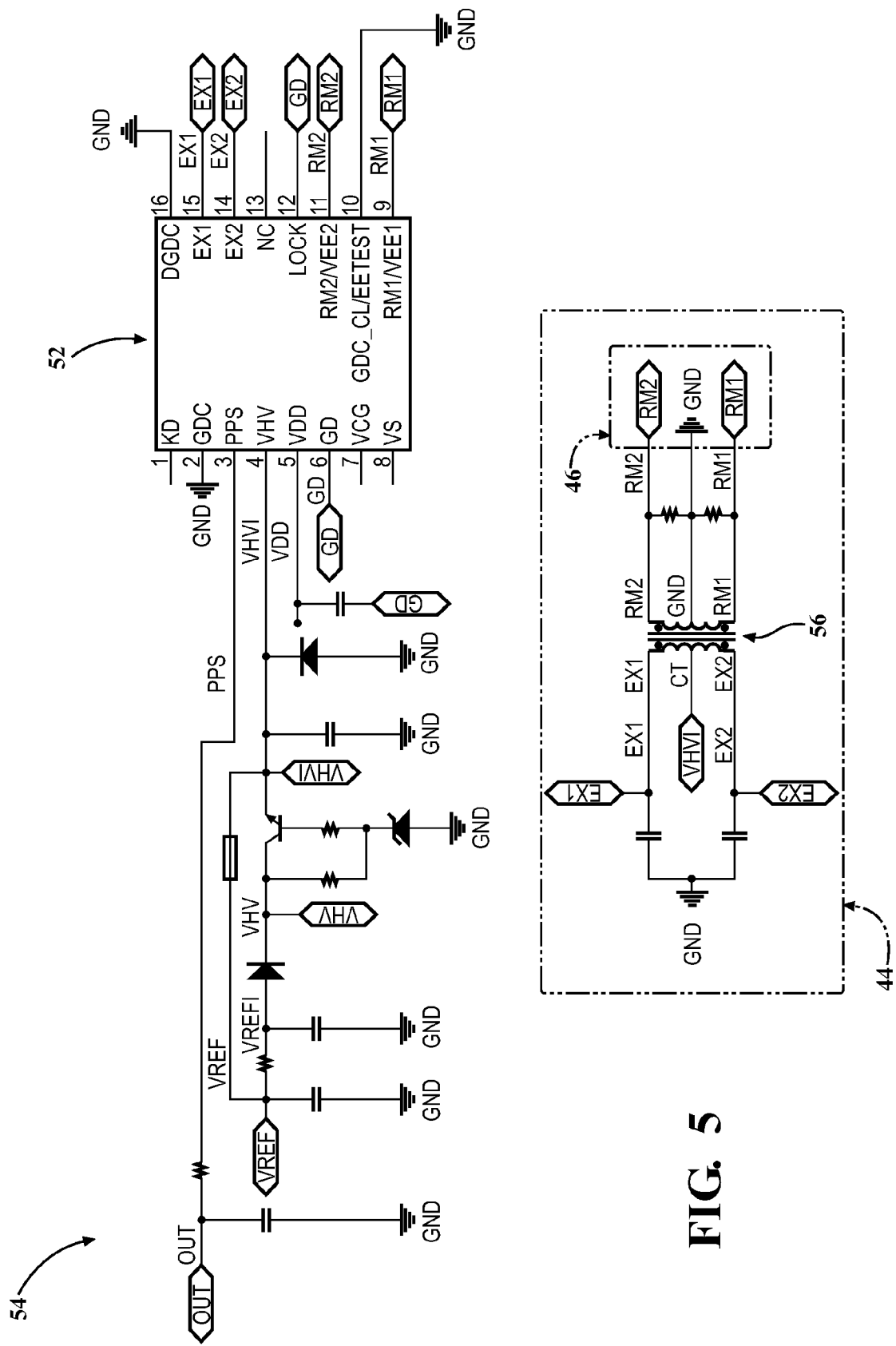
FIG. 5 illustrates an exemplary circuit diagram of the single printed circuit board, in accordance with an embodiment of the present invention.
Figure 6:
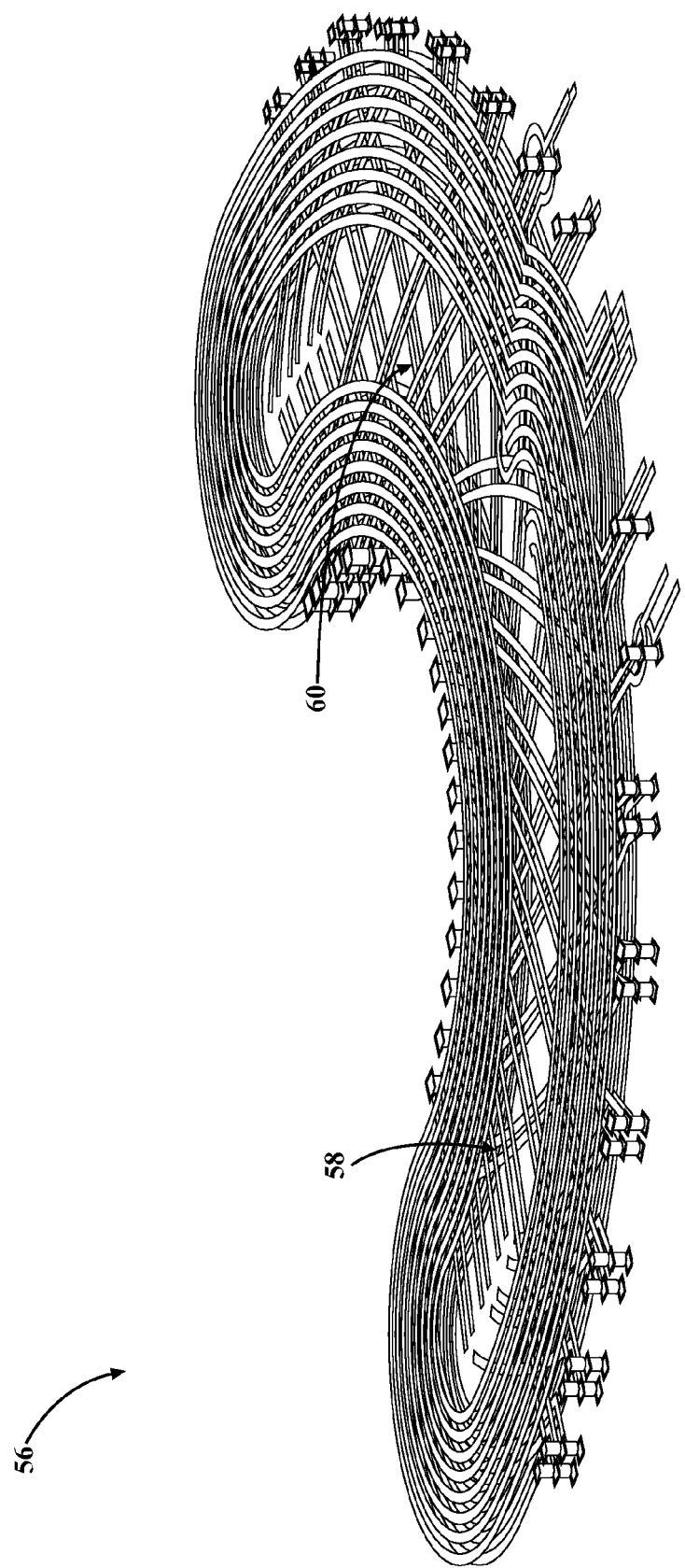
FIG. 6 illustrates the coil of the single printed circuit board, in accordance with an embodiment of the present invention.
Figure 8A:
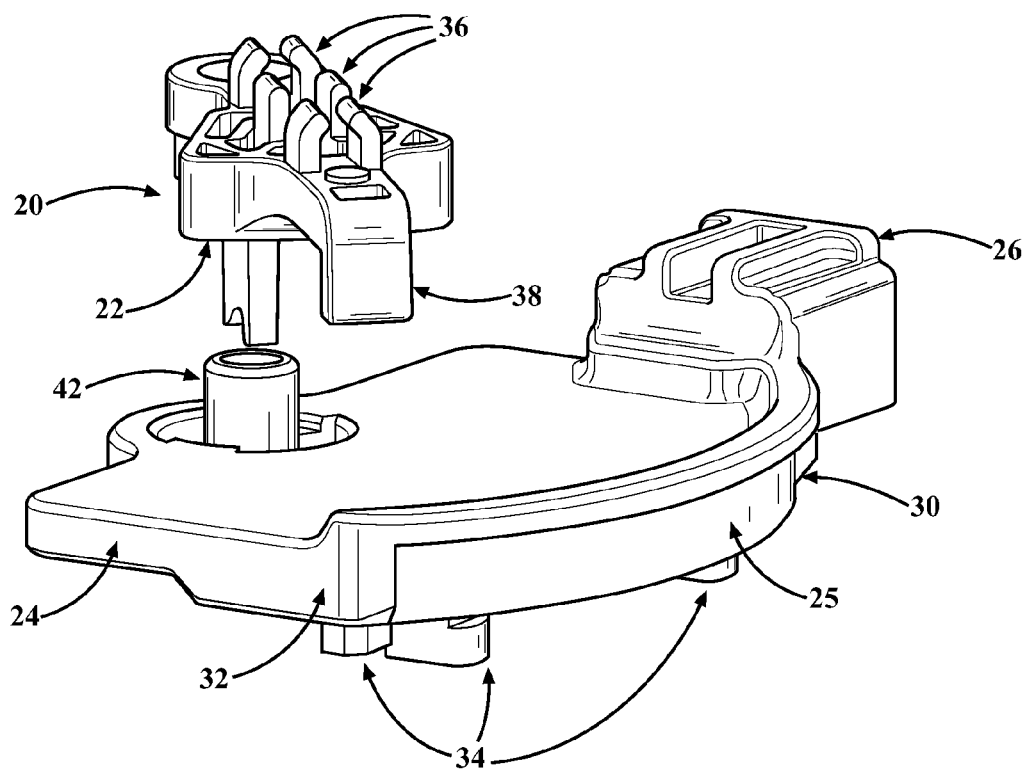
FIG. 8A illustrates from a top view, the rotor and the housing connecting, in accordance with an embodiment of the present invention.
Figure 8B:
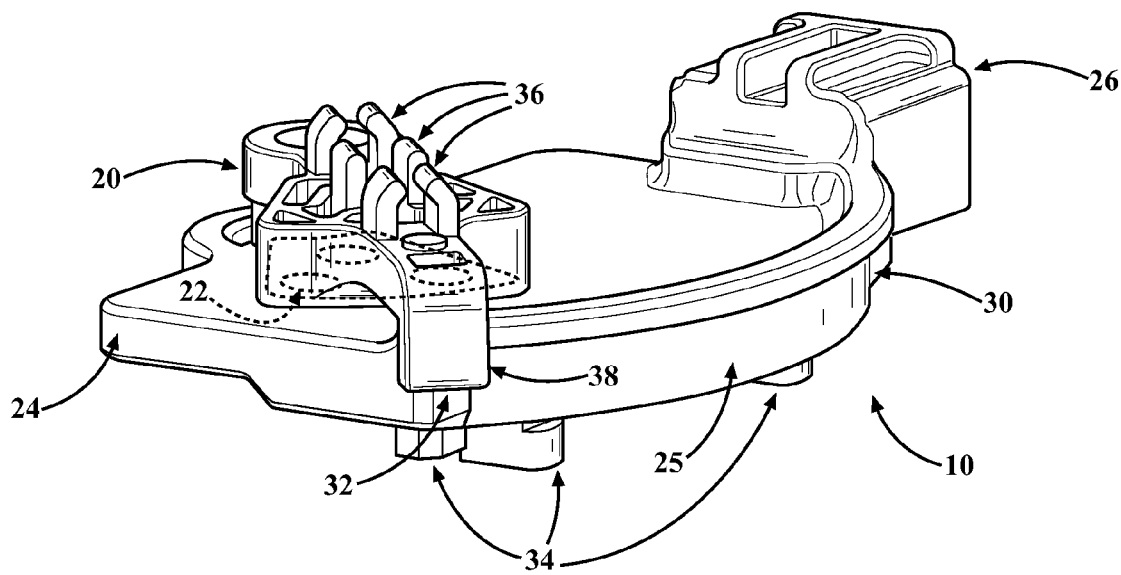
FIG. 8B illustrates the completed rotor connected pivotally to the housing, in accordance with an embodiment of the present invention.
Figure 9:
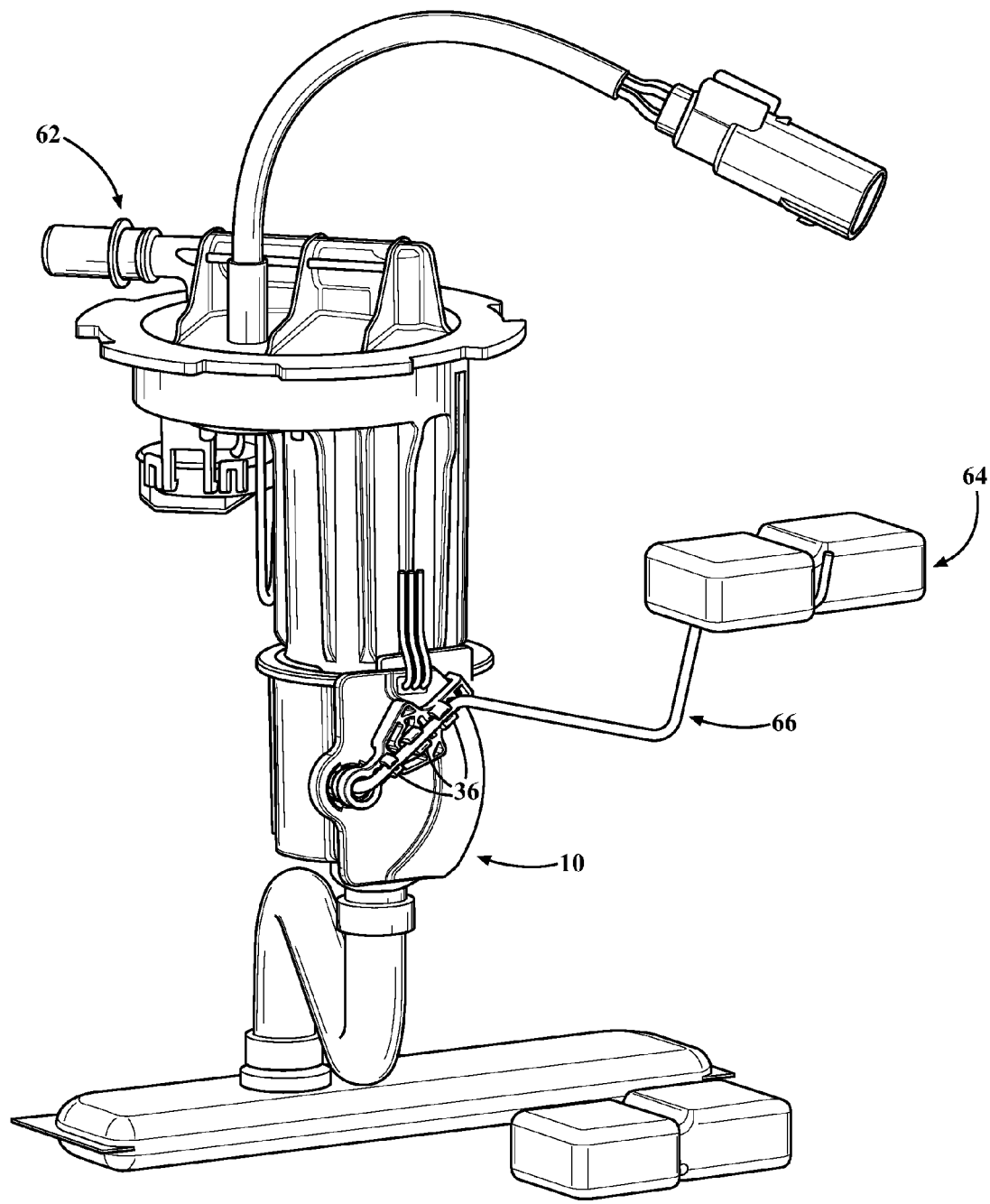
FIG. 9 illustrates the inductive sensor device 10 mounted onto a fuel pump system, in accordance with an embodiment of the present invention.
Figure 10A:
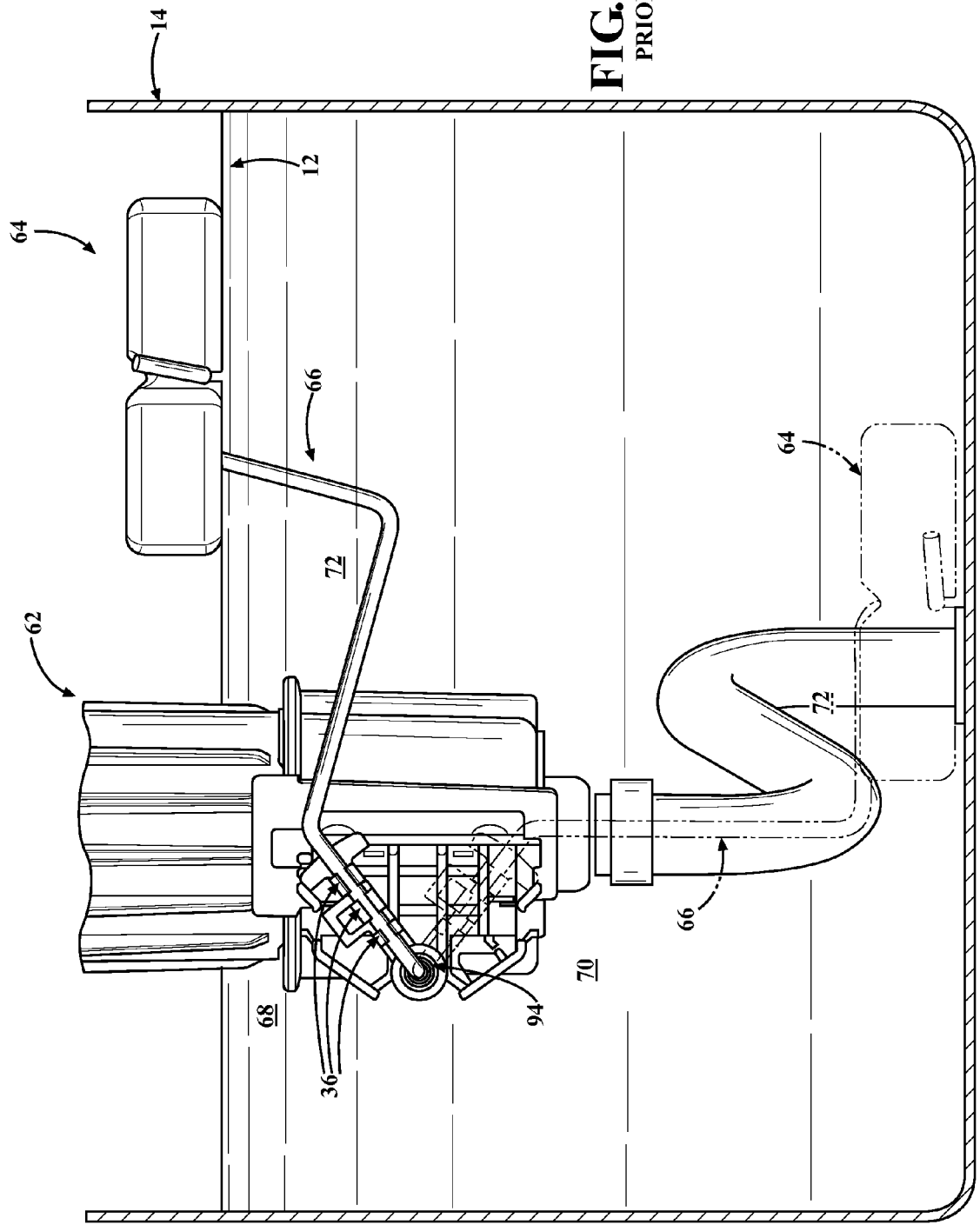
FIG. 10A illustrates a front view of a prior art vehicle fuel system with a contacting sensor (resistor card) fuel sensor operatively connected to the fuel system.
Figure 10B:
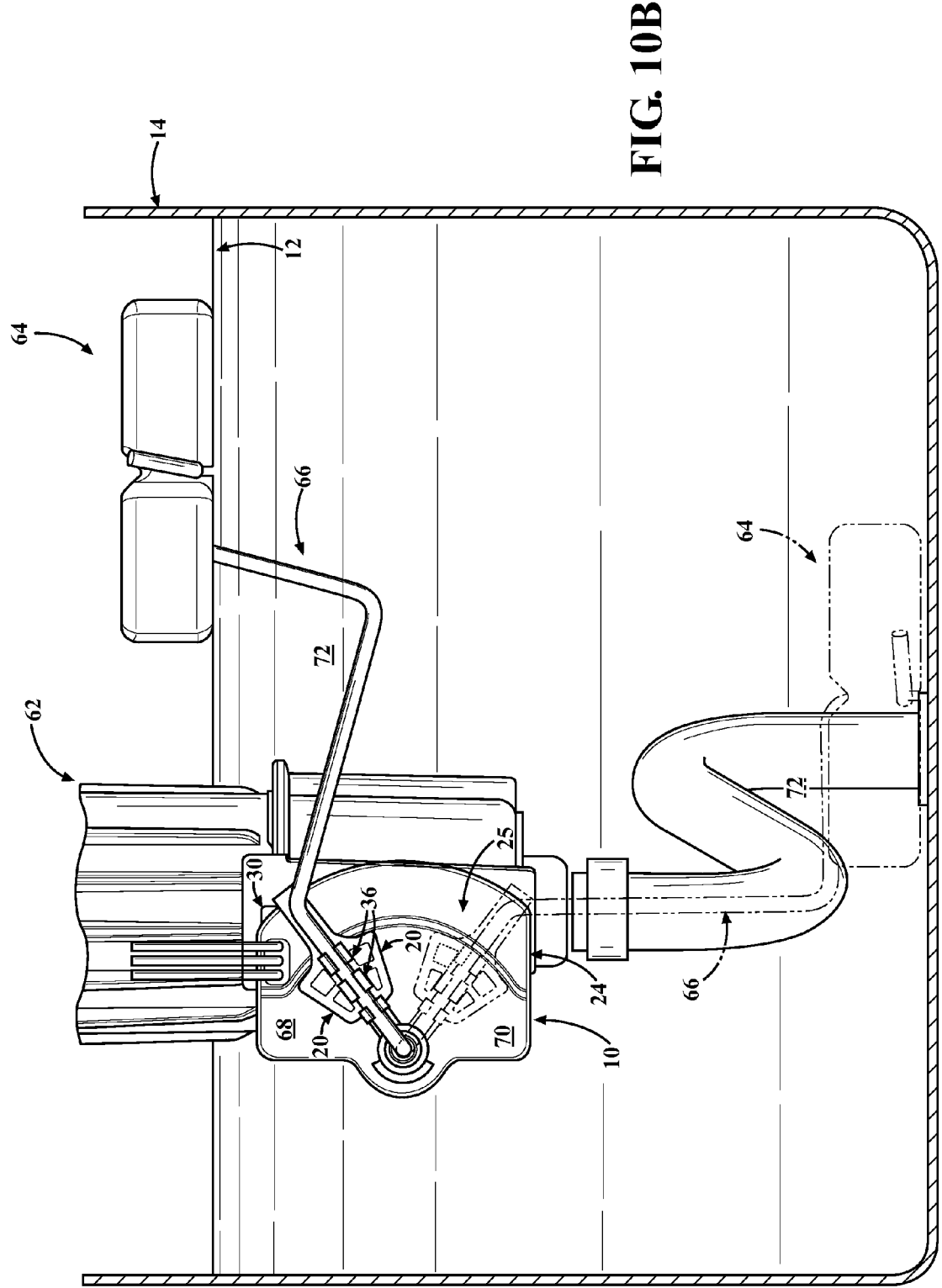
FIG. 10B illustrates a front view of the inductive sensor device 10 operatively connected to the fuel system, in accordance with an embodiment of the present invention.
Figure 11A:
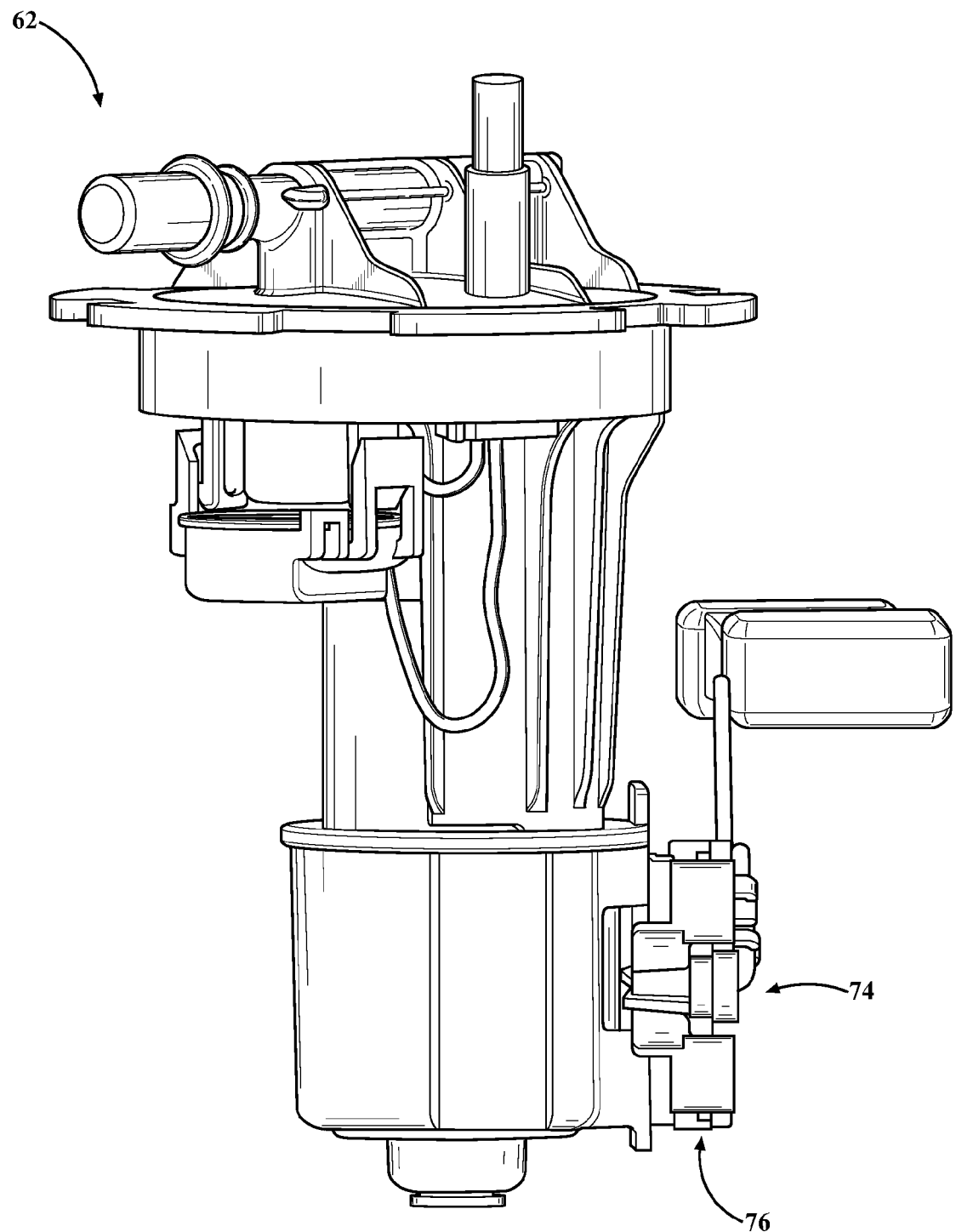
FIG. 11A illustrates a side view of a prior art vehicle fuel pump system with a contacting sensor (resistor card) fuel sensor operatively connected to the fuel system.
Figure 11B:
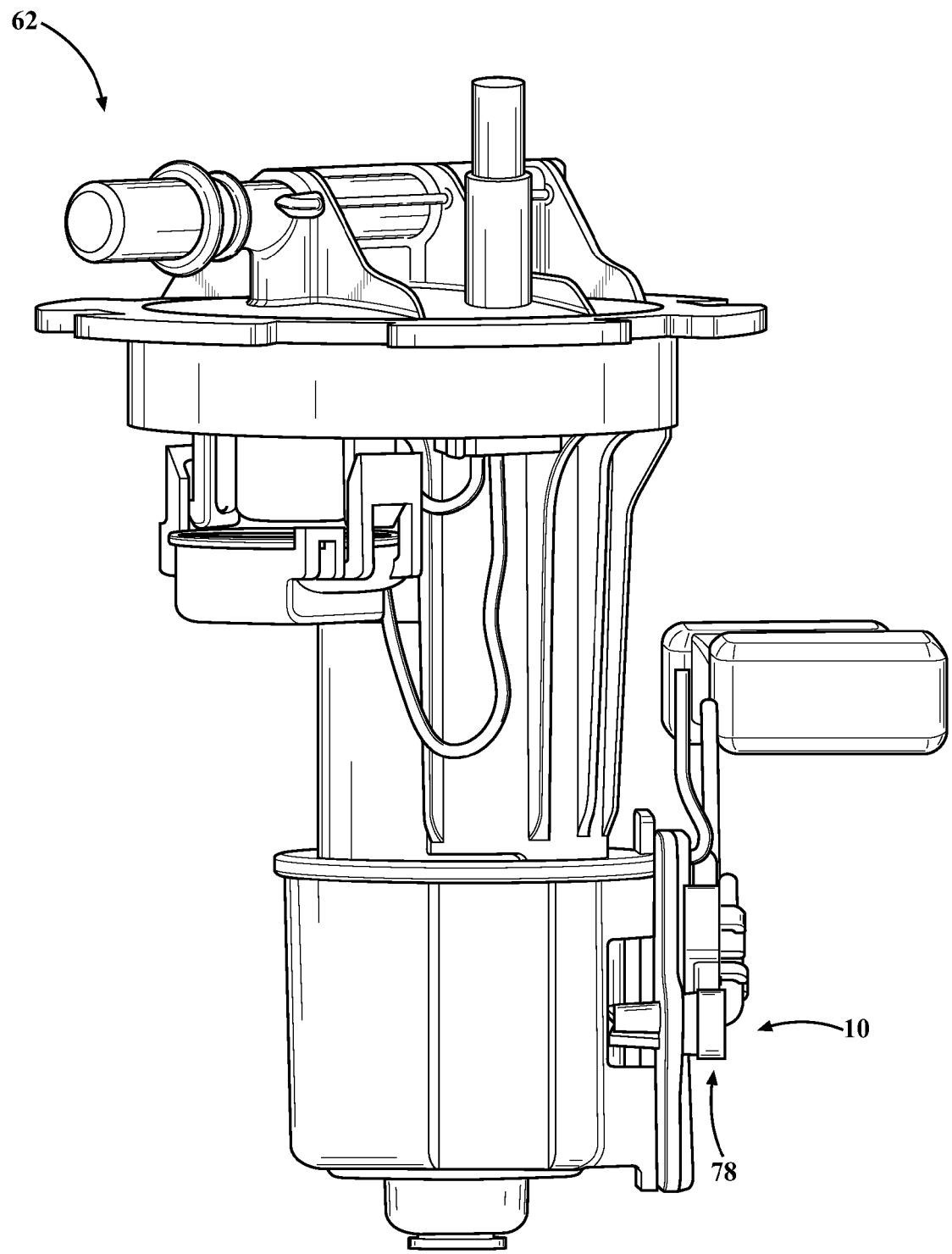
FIG. 11B illustrates a side view of the inductive sensor device 10 operatively connected to the fuel system, in accordance with an embodiment of the present invention.

With reference to FIGS. 4A-4B, 5, and 6, the single printed circuit board 28 has a microprocessor 52 and a passive wireless antenna system 44. The passive wireless antenna system 44 includes a plurality of electrical components 50 including capacitors, resistors, diodes, fuses, and terminal pins 46. The terminal pins 46 are preferably pressed fitted 48 into the printed circuit board 28 while the remaining electrical components 50 are preferably soldered by surface mount technology on the circuit board 28. Further, the passive wireless antenna system 44 comprises of an inductive coil containing at least one transmitting coil 58 and at least one receiving coil 60. When energized, the transmitting coil 58 produces an electromagnetic field. The sensing coupler 22 in the rotor 20 is a resonator and generates an induced magnetic field which is received by the receiving coils 60. The rotor 20 and sensing coupler 22 changes position on the housing 24 in reaction to the float 64 position based upon the liquid level 12 of the reservoir 14. The circuit board 28, through the passive wireless antenna system 44, detects the changes in the magnetic field generated by the coupler 22 and determines the position of the rotor 20 along the overmold housing 24. The circuit diagram 54, referred to in FIG. 5, illustrates that the microprocessor 52, powered by an outside source, receives the data from the passive wireless antenna system 44 and, in particular, the coil 56 transmits the induced magnetic field where the passive wireless antenna system 44 through the terminal pins 46 illustrated as RM1 and RM2, communicate with the microprocessor 52. The microprocessor 52 may then, through the integrated connector 26, output this information into a vehicle system and into a vehicle information display.

Now referring to FIGS. 9, 10A-10B, and 11A-11B, the inductive sensor 10 may be mounted to a fuel pump 62 within a fuel tank reservoir 14. The overmold housing 24, utilizing the mounting points 34 may be installed to the existing fuel sensor mount points (not shown). The flat rod 66 is clipped to the rotor 20 utilizing the flat rod attach clips 36 and to the fuel float 64 using a fastener system such as a clip, a rivet, or a bolt. As the liquid level 12 in the reservoir 14 changes, the float 64 acting as a buoy to the liquid level, will rise and fall. As a result, the rotor 20 is rotated about the overmold housing 24 within the guide track 25 between the up position (full) 68 and the lowered position (empty) 70. Moreover, the inductive sensor 10 uses the same flat rod attachment 66 as existing fuel sensors 74 and has the same angular range 72. As further shown in FIG. 11, the inductive sensor 10 is smaller than a prior art fuel sensor 76 but is designed to easily integrate with existing fuel systems. Moreover, the inductive sensor 10 footprint width 78 has shifted by 3.5 mm as compared with prior art 76.

The overmold housing 24, in a preferred embodiment, is formed from thermoset bulk molding compounds or alternatively thermoset epoxy based compounds.

The sensing coupler 22 in the present embodiment is ideally aluminum such as, without limitation, AL 500520-H2 or another type of aluminum with similar properties. Alternatively, steel may be used for the coupler 22 or any other conductive material.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

I claim:

1. A sensor device for sensing a level of a liquid within a reservoir having at least one inner wall, the sensor device comprising:
   a sensing inductive module, the sensing inductive module having a housing and an inductive coupler, the housing having a side surface, the sensing inductive module mounted within the reservoir spaced apart from all of the at least one inner wall of the reservoir;
   at least one receiving coil and at least one transmitting coil disposed radially outwardly from a pivot axis, the at least one receiving coil and the at least one transmitting coil mounted within the housing;
   a rotor pivotally connected to the side surface of the housing at the pivot axis, the rotor pivots coplanar with the at least one receiving coil and the at least one transmitting coil along the side surface of the housing; the inductive coupler mounted to the rotor; and
   a float connected to the rotor to pivot the inductive coupler along the side surface of the housing adjacent to the at least one receiving coil to generate a signal indicating the level of liquid in the reservoir.

2. The sensor of claim 1, wherein at least one single printed circuit board containing at least one transmitting coil and the at least one receiving coil is in communication with the inductive coupler.

3. The sensor of claim 1, wherein the signal is communicated to a vehicle information system.

4. A sensor device for measuring a level of fluid within a reservoir having at least one inner wall, the sensor device comprising:
   a sensing inductive module, the sensing inductive module having a housing and an inductive coupler, the housing having a side surface, the sensing inductive module mounted within the reservoir spaced apart from all of the at least one inner wall of the reservoir;
   at least one printed circuit board containing at least one transmitting coil and at least one receiving coil mounted within the housing, the at least one printed circuit board disposed radially outwardly from a pivot axis;
   a rotor pivotally connected to the side surface of the housing at the pivot axis, the rotor pivots coplanar with the printed circuit board along the side surface of the housing and adjacent to the at least one printed circuit board, the rotor having the inductive coupler, the rotor connected to a float contained within the liquid, the inductive coupler in communication with the at least one printed circuit board to measure angular displacement of the rotor in response to movement of the float.

5. The sensor device of claim 4, wherein the single printed board is encapsulated in the housing.

6. The sensor device of claim 5, wherein the housing has at least one integrated connector.

7. The sensor device of claim 6, wherein the integrated connector of the housing connects to a vehicle system.

8. The sensor device of claim 5, wherein a passive wireless antenna is connected to the single printed circuit board within the housing.

9. The sensor device of claim 5, wherein a sensing element of conductive metal snaps into the housing.

10. The sensor device of claim 9, wherein the coupler is comprised of steel.

11. The sensor of claim 9, wherein as the rotor rotates, the changing position of the sensing element is detected by a passive wireless antenna connected to the single printed circuit board.

12. The sensor device of claim 5, wherein the rotor is pivotally connected to the housing.

13. The sensor device of claim 12, wherein the rotor, utilizing a clip assembly consisting of flexible clip ends and arms, snaps into a preformed receiver within the housing.

14. The sensor device of claim 5, wherein the rotor rotates about the housing between an up position and a down position as the fluid level in a tank changes.

15. The sensor device of claim 5, wherein the housing has at least one up-stop, at least one down-stop, at least one guide track, and at least one mounting point on a side opposite the rotor.

16. The sensor device of claim 5, wherein the housing is mounted to an existing fuel sensor mount points on a fuel pump and the first end of a rod is attached to the rotor through preformed clips on the backside of the rotor and the second end of the rod is attached to the fuel float.

17. The sensor device of claim 5, wherein the sensor is a fuel level sensor for a vehicle.

18. A sensor device for measuring a level of fluid within a reservoir having at least one inner wall, the sensor device comprising:
   a sensing inductive module, the sensing inductive module having a housing and a sensing coupler, the housing having a side surface, the sensing inductive module mounted within the reservoir spaced apart from the all the at least one inner wall of the reservoir;
   at least one printed circuit board containing at least one transmitting coil and at least one receiving coil mounted within the housing, the at least one printed circuit board disposed radially outwardly from a pivot axis;
   a rotor pivotally connected to the side surface of the housing at the pivot axis, the rotor pivots coplanar with the printed circuit board along the side surface of the housing and adjacent to the printed circuit board, the rotor having the sensing coupler, the rotor connected to a float contained within the fluid, the sensing coupler in communication with the printed circuit board to measure angular displacement of the rotor in response to movement of the float;
   the at least one transmitting coil providing an electric current, the at least one transmitting coil produces an electromagnetic field when energized;
   the sensing coupler in the rotor is a resonator and generates an induced magnetic field which is received by the at least one receiving coil; and
   the at least one printed circuit board-detects the changes in the magnetic field generated by the sensing coupler and determines a position of the rotor.

* * * * *